United States Patent [19]

Bergh

[11] Patent Number: 4,664,798
[45] Date of Patent: May 12, 1987

[54] APPARATUS AND METHOD FOR FILTERING A FLUID

[76] Inventor: Leslie H. Bergh, 3130 Hwy. 30 West, Evanston, Wyo. 82930

[21] Appl. No.: 924,614

[22] Filed: Oct. 29, 1986

Related U.S. Application Data

[63] Continuation of Ser. No. 661,250, Oct. 15, 1984, abandoned.

[51] Int. Cl.⁴ ............................................. B01D 29/24
[52] U.S. Cl. .................................... 210/241; 210/253; 210/339; 210/416.5; 210/450; 210/452; 210/455
[58] Field of Search ............... 210/130, 132, 170, 171, 210/251, 241, 254, 323.2, 253, 258, 416.1, 335, 416.5, 445, 451, 452, 453, 455, 767, 781, 787, 788, 806, 339, 346, 450

[56] References Cited

U.S. PATENT DOCUMENTS

| | | | |
|---|---|---|---|
| 522,407 | 7/1894 | Cummings et al. | 210/253 |
| 535,366 | 3/1895 | Field | 210/253 |
| 714,956 | 12/1902 | Simmons | 210/253 |
| 2,425,848 | 8/1947 | Vawter | 210/253 |
| 3,223,241 | 12/1965 | Kasten | 210/339 |
| 3,397,784 | 8/1968 | Carr | 210/108 |
| 3,487,936 | 1/1970 | Klein | 210/253 |
| 3,618,781 | 11/1971 | Brown | 210/341 |
| 3,757,956 | 9/1973 | Bradel et al. | 210/333 |
| 4,033,870 | 7/1977 | Parquet et al. | 210/90 |
| 4,049,548 | 9/1977 | Dickerson | 210/96 |
| 4,187,179 | 2/1980 | Harms | 210/323.2 |
| 4,304,663 | 12/1981 | Manders | 210/130 |
| 4,322,293 | 3/1982 | Morgan, Jr. | 210/323.2 |
| 4,419,234 | 12/1983 | Miller et al. | 210/323.2 |
| 4,461,707 | 7/1984 | Thayer et al. | 210/323.2 |
| 4,522,717 | 6/1985 | Brust | 210/323.2 |
| 4,534,869 | 8/1985 | Seibert | 210/259 |

OTHER PUBLICATIONS

Millhone, Ralph S., "Completion Fluids for Maximizing Productivity—State of the Art", Society of Petroleum Engineers of AIME, Jan. 1983, pp. 47–55.

Primary Examiner—Richard V. Fisher
Assistant Examiner—Wanda L. Millard
Attorney, Agent, or Firm—Sheridan, Ross & McIntosh

[57] ABSTRACT

Apparatus and method for filtering contaminated fluids at various locations using at least a first and second filter unit mounted on a mobile base. Each filter unit has a plurality of filter vessels with each of the filter vessels having a plurality of filter elements and dual plate mounting. In each filter unit, the contaminated fluid is first coarse filtered and then fine filtered. Means are provided to by-pass either the first or second filter unit so that the filter elements can be changed or for by-passing both the first and second unit when desired.

9 Claims, 6 Drawing Figures

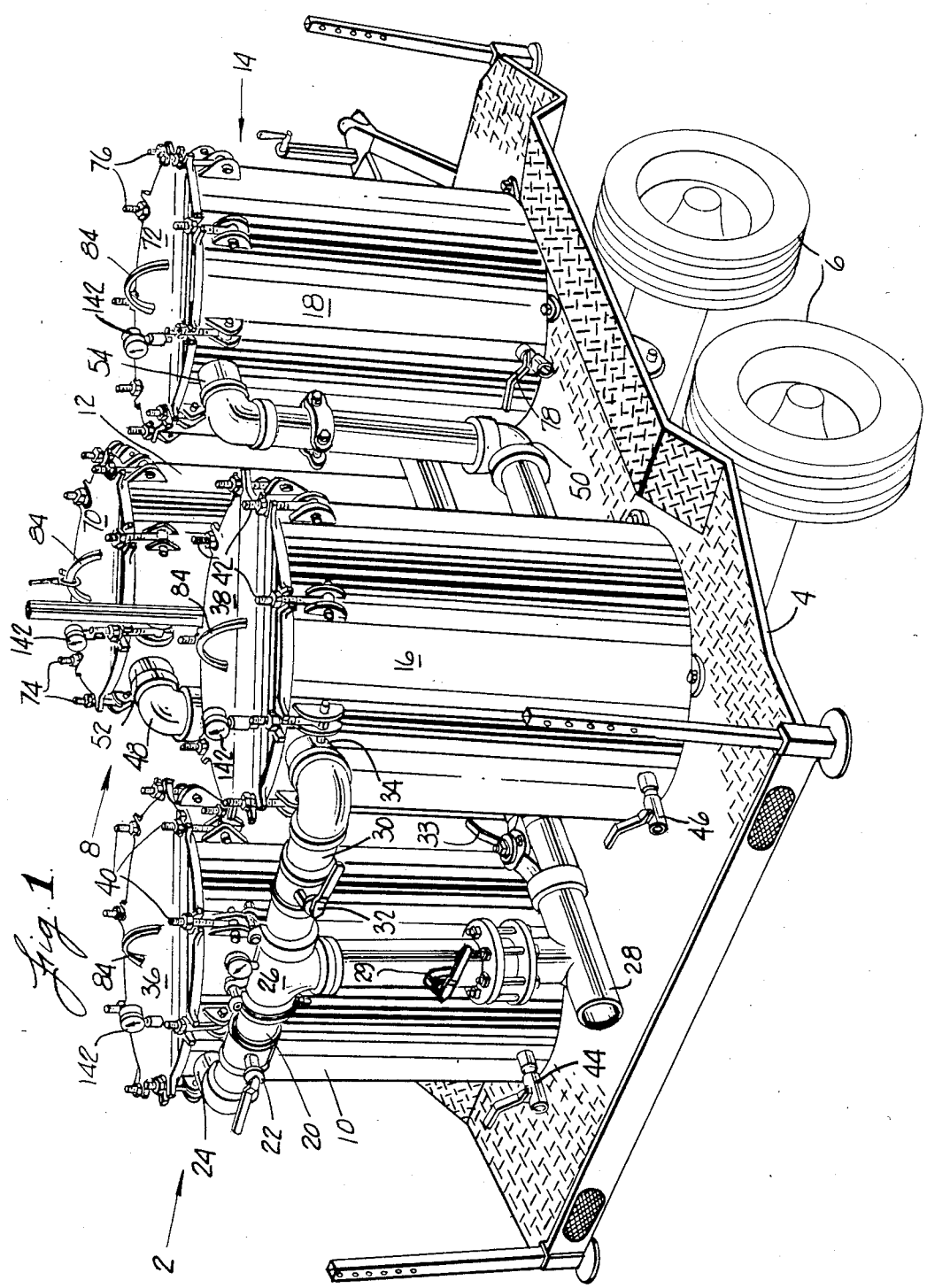

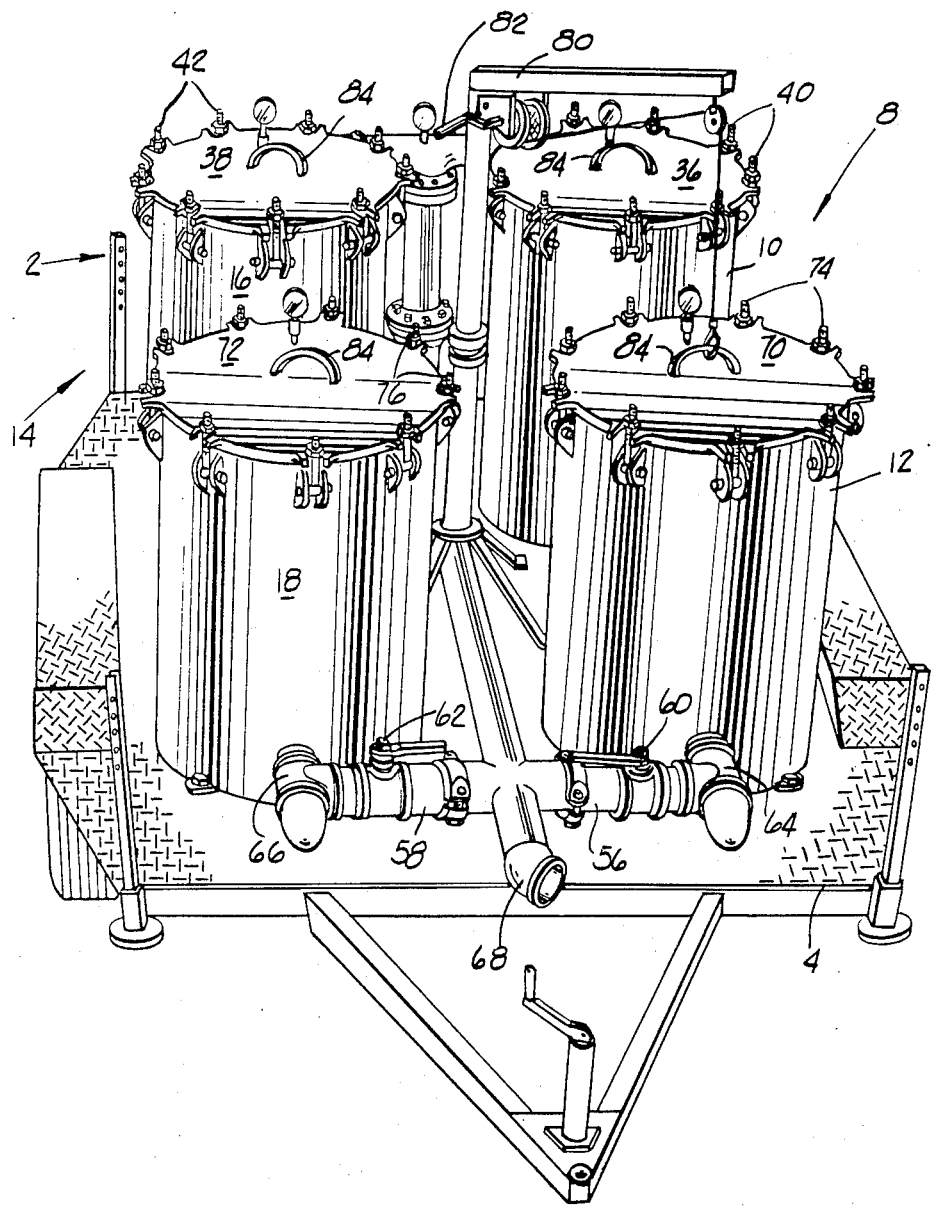

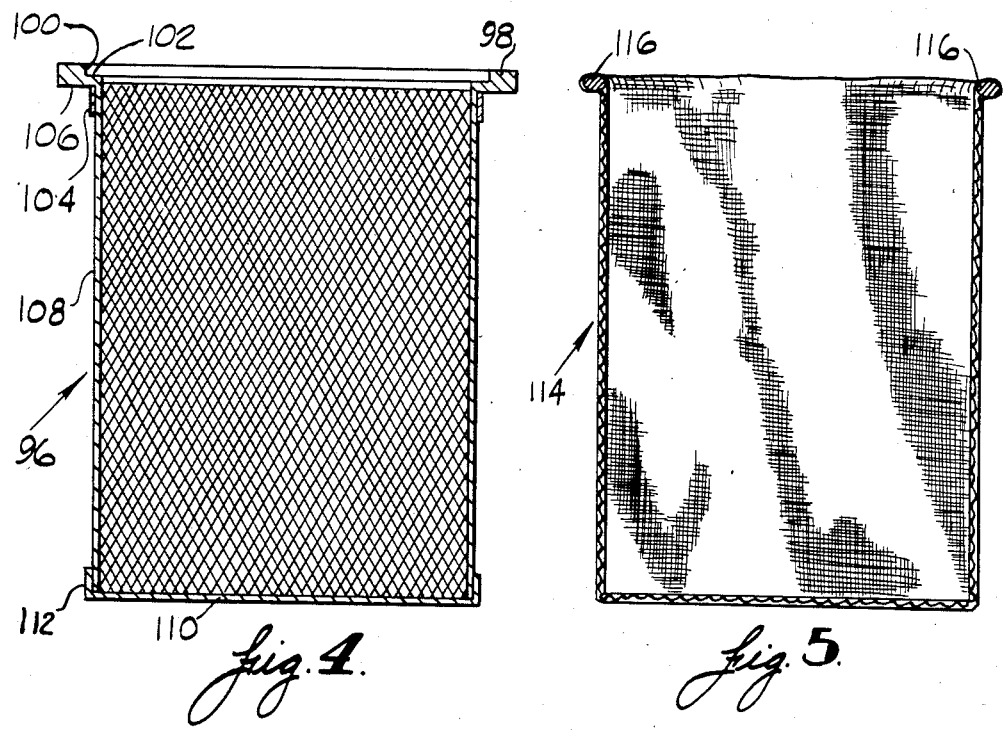
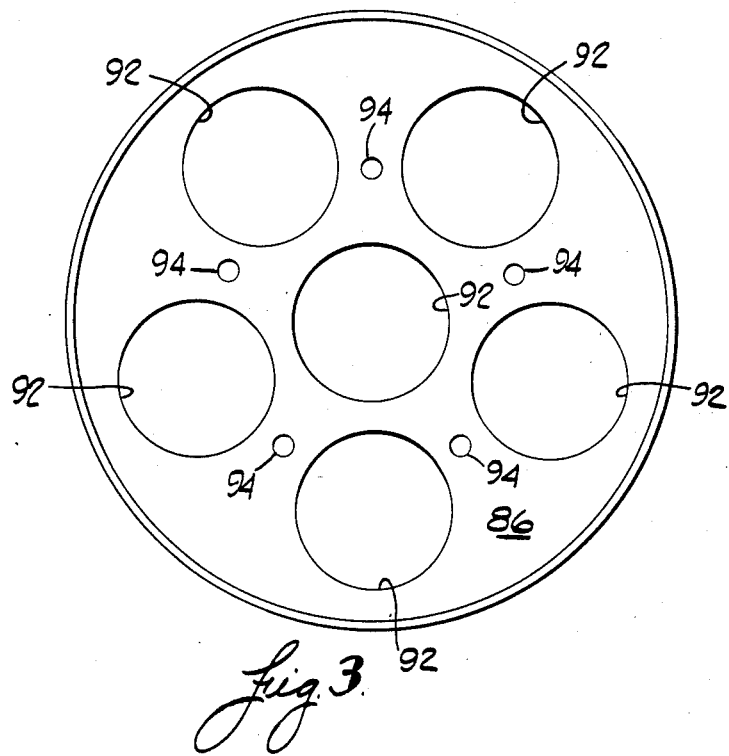

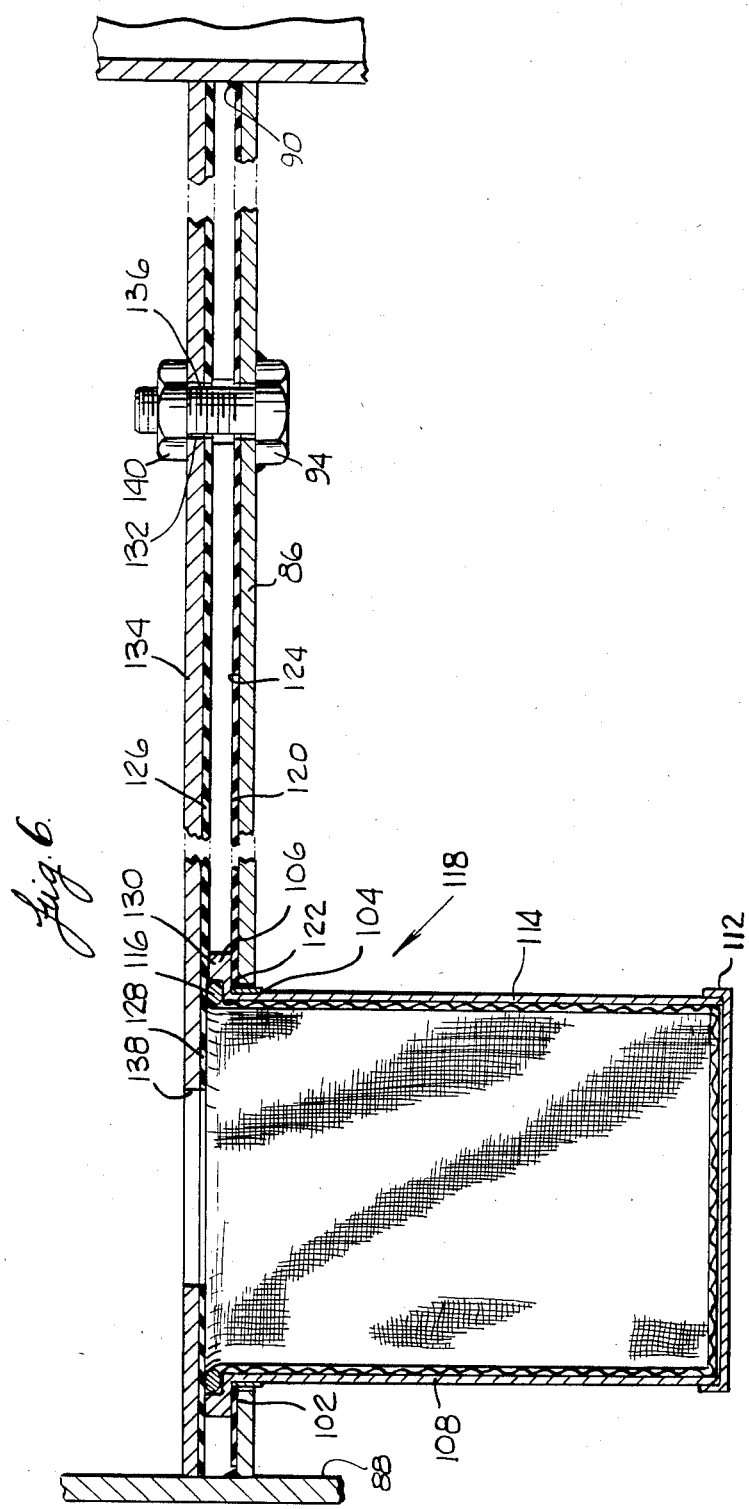

APPARATUS AND METHOD FOR FILTERING A FLUID

This is a continuation of application Ser. No. 661,250, filed Oct. 15, 1984, now abandoned.

BACKGROUND OF THE INVENTION

This invention relates to the filtering of contaminated fluids so as to remove the contaminants therefrom and more particularly in relationship to dual filtering units wherein one filtering unit may be by-passed for cleaning of the other filtering unit or both of the filtering unit may be by-passed when the contamination level of the fluid is below that which requires filtering and in particular to the on-site use of such filtering units in the drilling, operating or closing of a well hole.

BACKGROUND OF THE INVENTION

During many operations of the drilling, operating or closing of a well hole, it is necessary to use completion fluids. Such well activities include pay zone drilling and/or underreaming, perforating, gravel packing, chemical treatments, hydraulic fracturing, cleanout, well killing, zone selective operations, and tubing and hardware replacement. The different kinds of operations require different kinds of completion fluids to be used but in all instances it is necessary that the completion fluids must be solids free, i.e., the completion fluids should contain less than 2 parts per million of solids, all smaller than two microns nominal size. To obtain this degree of cleanness, an on-site solids removal system, such as that illustrated in the article, "Completion Fluids for Maximizing Productivity—State of the Art" published in the Journal of Petroleum Technology, January 1983 pages 47-55, is used. In this type of installation, it is necessary to install the solids removal system and leave it in place during all the operating time of the well hole even though it is not necessary to use completion fluids during all the time that the well hole is in operation.

Dual filtering units wherein one filtering unit may be by-passed for cleaning or replacing the filtering elements therein are disclosed in Carr (U.S. Pat. No. 3,397,784); Brown (U.S. Pat. No. 3,618,781); Bradel et al. (U.S. Pat. No. 3,757,956); and Parquet et al. (U.S. Pat. No. 4,033,870). Dickerson (U.S. Pat. No. 4,049,548) discloses a mobile unit for demineralizing water to satisfy nuclear grade requirements comprising banks of cylinders wherein each cylinder may be separated from the system for replacement. The foregoing patents do not disclose a mobile filtering system for on-site use in a well hole operation comprising dual filter units each having a plurality of filter vessels having filter elements of different pore sizes. In all of the foregoing patents, it is necessary that the fluid be sent through at least part of the filtering units at all times during the operation thereof.

BRIEF SUMMARY OF THE INVENTION

This invention provides a dual system of filtering units wherein the contaminated fluid may be passed through a first and second filter unit at the same time or wherein one of the filter units may be by-passed so that the filter elements therein may be removed and replaced with new filter elements. The filtering system is also provided with means so that both the first and second filter units may be by-passed when the fluid involved has a contamination level that does not require the removal of solids therefrom.

In the preferred embodiment of the invention, the filtering system comprises a first and a second filter unit. Each filter unit comprises a first and a second filter vessel, each vessel having a plurality of filter elements therein. The filter elements in the first filter vessel are a relatively coarse micron filter element and the filter elements in the second filter vessel are a relatively fine micron filter element. Means are provided for connecting the inlet side of each filter unit to a supply of the fluid to be treated and means are provided to connect the outlet side of each filter unit to a discharge conduit which conduit is preferably connected to the suction side of a rig pump. Means are also provided to connect the discharge conduit directly to the supply of fluid. Valve means are provided to open and close all of the connecting means so that both filter units may operate at the same time; one of the filter units may be by-passed for the replacement of filter elements therein; or both of the filter elements may be by-passed.

In the preferred embodiment of the invention, the filter vessels are designed so that they may be mounted on a mobile base, such as a trailer, and moved to an on-site location and after being connected to the source of fluid and the suction side of the drill rig be ready for operation. Therefore, the filtering system may be readily moved from one well site to another well site for use when needed.

It is an object of this invention to provide a dual filter system with means for by-passing the filtering system.

It is another object of this invention to provide a dual filter system with means for by-passing the filtering system for use with completion fluids at well hole operations which can be readily transported from one well hole to another well hole.

It is another object of this invention to provide a dual filtering system having a first and second filter unit, each having filter elements of different pore sizes.

Other features and advantages of the invention will be apparent from the following more particular description of preferred embodiments as illustrated in the accompanying drawing in which like reference characters refer to the same parts throughout the various views. The drawing is not necessarily to scale, emphasis instead being placed upon illustrating the principles of the invention.

BRIEF DESCRIPTION OF THE DRAWING

FIG. 1 is a pictorial view of the inlet side of the invention;

FIG. 2 is a pictorial view of the outlet side of the invention;

FIG. 3 is a top plan view of a filter vessel with the cover removed;

FIG. 4 is a view in cross section of a filter basket;

FIG. 5 is a view in cross section of a filter bag; and

FIG. 6 is a view with parts in section illustrating the assembly of a filter element in a filter vessel.

DETAILED DESCRIPTION OF THE INVENTION

In the preferred embodiment of the invention, as illustrated in FIGS. 1 and 2, there is provided a filtering system 2 which is mounted on the bed 4 of a trailer which is provided with wheels 6 so that it may be readily transported to a desired location. The filtering system 2 is primarily for use with completion fluids used in well hole operations so that it must be able to be moved over rough terrain. In some instances, it may be desirable to replace the wheels 6 with skids (not shown).

The filtering system 2 comprises a first filter unit 8 comprising a first filter vessel 10 and a second filter vessel 12 and a second filter unit 14 comprising a first filter vessel 16 and a second filter vessel 18. Piping means 20, including an on-off valve 22, extend from the inlet 24 of the first vessel 10 to piping means 26 terminating at an end 28 which is connected to a supply of fluid by conventional pipe joint means (not shown). An on-off valve 29 is located between the piping means 26 and the end 28. Piping means 30, including an on-off valve 32, extend from the inlet 34 of the first vessel 16 to the piping means 26. An on-off valve 33 cooperates with the on-off valves 29, 22 and 32 to control the flow of the supply fluid through filter vessels 10 and 12 or 16 and 18 or to by-pass the filter vessels 10, 12, 16 and 18 completely. The first vessels 10 and 16 are provided with removable lids 36 and 38 which are held in position thereon by means 40 and 42. Drain means 44 and 46 are provided for the first vessels 10 and 16.

The filtered fluid exits from adjacent the bottom of the first vessels 10 and 16 through piping means 48 and 50 and enters into second vessels 12 and 18 through inlets 52 and 54 adjacent to the tops thereof. Piping means 56 and 58, including on-off valves 60 and 62, extend from the outlets 64 and 66 of the second vessels 12 and 18 to a discharge conduit 68 which discharge conduit 68 is connected by conventional means (not shown) to the suction side of a rig pump (not shown). The second vessels 12 and 18 are provided with removable lids 70 and 72 which are held in position thereon by means 74 and 76. Drain means 78 are provided for the second vessel 18. Similar drain means (not shown) are provided for the second vessel 12. A boom 80 with crank means 82 is provided for cooperation with the handles 84 on the removable lids 36, 38, 70 and 72 for a purpose described below.

In each of the filter vessels 10, 12, 16 and 18, there is mounted a plate 86 which is secured to the inner surface 88 of each vessel by suitable means, such as a continuous weld 90, so as to form a continuous seal between the inner surface 88 and the plate 86 and also to hold the plate 86 in the desired location. The plate 86 is provided with a plurality of openings 92, which in the preferred embodiment are circular but can be of any desired geometrical configuration. A plurality of bolts 94 having external threads are permanently secured to the plate 86 by suitable means, such as by welding. In the preferred embodiment illustrated in FIG. 3, there are five openings 92 and five bolts 94, spaced equidistantly apart and one central opening 92.

A filter basket 96 is illustrated in FIG. 4 and comprises an annular ring 98 having a recessed portion 100 opening inwardly so as to form a supporting surface 102. A generally cylindrical band 104 is secured to the bottom surface 106 of the annular ring 98 by suitable means, such as by welding. A generally cylindrical member 108 formed from flattened expanded metal is secured to the inner surface of the band 104 by suitable means, such as by welding. A bottom 110, also formed from flattened expanded metal, is provided with an upstanding side wall 112 which side wall 112 is secured to the outer surface of the cylindrical member 108 by suitable means, such as by welding.

In FIG. 5, there is illustrated a filter bag 114 adapted to be used in the filter basket 96. The filter bag 114 may be formed from any appropriate material such as rayon, nylon, polyester, polypropylene or other similar materials and can be supplied in 100, 50, 25, 10, 5 and 1 micron sizes. The open end of the filter bag 114 is secured to a ring 116 formed from steel or other suitable material and having a diameter slightly greater than the depth in an axial direction of the recess 100 in the annular ring 98 for a purpose described below. The filter bag 114 is secured to the ring 116 by wrapping a portion of the filter bag around the ring 116 and sewing it in place.

An assembled filter element 118 is illustrated in FIG. 6. In making the assembly illustrated in FIG. 6, the plate 86 has been welded to the inner surface 88 of the vessel. A sealing gasket 120 having a plurality of openings 122 corresponding in number to the number of openings 92 is placed over the upper surface 124 of the plate 86 so that the openings 122 are aligned over the openings 92. The sealing gasket 120 has an outer diameter slightly less than the inner diameter of the vessel 10, 12, 16 or 18. A filter basket 96 is then inserted through each opening 92 until the bottom surface 106 is in contact with the portion of the sealing gasket 120 surrounding each opening 92. A filter bag 114 is then inserted into the filter basket 96 until the ring 116 is in contact with and supported by the surface 102 of the annular ring 98. If desired, the filter bag 114 may be positioned in the filter basket 96 before the filter basket 96 is assembled. A sealing gasket 126 having a plurality of openings 128 corresponding in number to the number of openings 92 is positioned within the vessel so that a portion of the sealing gasket 126 surrounds each of the openings 128 and is in contact with the upper surface 130 of each annular ring 98. The sealing gasket 126 has an outer diameter slightly less than the inner diameter of the vessel 10, 12, 16 or 18. The diameter of the openings 128 is substantially smaller than the diameter of the openings 92 to ensure the contact between the portions of the gasket 126 and the upper surface 130 of each annular ring 98. The sealing gasket 126 has a plurality of openings 132 corresponding in number and location to the bolts 94 so that when the sealing gasket 126 is positioned in each vessel 10, 12, 16 or 18 the threaded portion of the bolts 94 extend through the openings 132. A plate 134 having a plurality of openings 136 spaced equidistantly apart and corresponding in number to the number of bolts 94 and of a size to allow passage of the bolts 94 therethrough is positioned in each vessel 10, 12, 16 or 18 so that the bolts 94 extend through the openings 136. The plate 134 is also provided with a plurality of openings 138 corresponding in number to the number of openings 128 and when in assembled relationship, the openings 138 are aligned with the openings 128. The outer diameter of the plate 134 is slightly less than the inner diameter of each vessel 10, 12, 16 or 18 to allow for relative movement in a longitudinal direction between each plate 134 and each vessel 10, 12, 16 or 18. A nut 140 is threaded onto each bolt 94 and tightened so as to move plate 134 toward plate 86. The nuts 140 are tightened in an amount sufficient to move plate 134 toward plate 86 so that the gasket 126 forms an effective seal between the plate 134 and each upper surface 130 of each annular ring 98 and the gasket 124 forms an effective seal between the plate 86 and the bottom surface 106 of each annular ring 98. Also, the sealing gasket 126 acts on the ring 116 so that the ring 116 is firmly seated on the surface 102.

In one embodiment of the invention, each vessel 10, 12, 16 and 18 has a diameter of about 30 inches, a height of about 38 inches and a wall thickness of about ⅜ inch and a bottom thickness of about ½ inch. The plate 86 is ⅜ inch in thickness, has a diameter of about 29 ¼ inches and is welded by a continuous weld to the inner surface 88 of each vessel. The diameter of each opening 92 is about 7 ½ inches. The annular ring 98 has an outer diameter of about 8⅝ inches., an inner diameter of about 6 13/16 inches, the diameter of the recess 100 is about 7 ¼ inches and the axial depth of the recess 100 is about 3/16 inch. The band 104 is formed from 10 gauge steel having a width of about ½ inch and formed into a band having an outer diameter of about 7 ⅛ inches. The generally cylindrical member 108 is formed from ½-13 flattened expanded metal, such as carbon steel, and has an inner diameter of about 6 13/16 inches. The bottom 110 is formed from a similar material and the outside diameter of the wall 112 is about 7 inches. Each gasket is formed from nitrile or other similar material generally used in forming gaskets. The plate 134 has a thickness of about ¼ inch and a diameter of about 29 ⅛ inches. The bolts 94 are 1×2 ½ inch bolts with mating nuts 140. The vessels 10, 12, 16 and 18 are mounted on the bed 4 by any conventional means and the various conduits and valves are joined together in a conventional manner.

In operation, the trailer with all of the various components mounted thereon is pulled to an on-site location. The end 28 is connected to a supply of fluid and the discharge conduit is connected to the suction side of a rig pump. If the fluid does not have to be filtered, the valves 29, 22, 32, 60 and 62 are in a closed position and the valve 33 is in an open position. If the supply fluid is to be filtered, the valve 33 is moved to a closed position and the valves 29, 22 and 60 are moved to an open position so that the supply fluid moves through filter vessels 10 and 12 and the filtered fluid exits through discharge conduit 68. Suitable gauges 142 are provided to indicate when the filter bags 114 in the baskets 96 of the filter vessels 10 and 12 have to be changed. When this is necessary, the valves 22 and 60 are moved to a closed position and the valves 32 and 62 are moved to an open position so that the supply fluid moves through filter vessels 16 and 18 and the filtered fluid exits through discharge conduit 68. The lid 40 is loosened and lifted and moved by the boom 80 and crank 82 to an out of the way location and the filter bags 114 in the filter vessel 10 are removed and new filter bags are installed. The cover 40 is then repositioned and secured. The operation is then repeated on the filter vessel 12. In most operations, the filter bags 114 will be in the sizes described above with the filter bags 114 in the filter vessels 10 and 16 being of a relatively coarse micron cut and the filter bags 114 in the vessels 12 and 18 being of a relatively fine micron cut.

While the preferred embodiments of the invention have been illustrated and described herein, it may be otherwise embodied and practiced within the scope of the following claims.

What is claimed is:

1. Apparatus for use in filtering a fluid so as to remove contaminants therefrom comprising:
   a first filter unit including first and second filter vessels and having an inlet and an outlet;
   a source of contaminated fluid;
   means connecting said inlet of said first filter unit to said source of contaminated fluid and forming a passageway for flow of contaminated fluid therethrough;
   a discharge conduit;
   means connecting said outlet of said first filter unit to one end of a discharge conduit and forming a passageway for flow of filtered fluid therethrough;
   a second filter unit including third and fourth filter vessels and having an inlet and an outlet;
   means connecting said inlet of said second filter unit to said source of contaminated fluid and forming a passage for flow of contaminated fluid therethrough;
   means connecting said outlet of said second filter unit to said discharge conduit and forming a passageway for flow of filtered fluid therethrough;
   means connecting said discharge conduit to said source of contaminated fluid and forming a passageway for flow of fluid therethrough so that when the contamination is less than a predetermined level said first and second filter units may be by-passed;
   means for opening or closing each of said passageways;
   a plurality of filter elements, each of said filter elements having an upper portion, an opening and filtering material and, for each of said filter elements, each of said openings extending to be continuous with said filtering material at said upper portion of said filter element;
   a plurality of O-rings, each of said O-rings engaging one of said filter elements;
   means in each of said four filter vessels for mounting said filter elements, said means for mounting comprising:
   a first plate fixedly secured to an inner surface of said vessel in sealing relationship therewith;
   means for fixedly securing said first plate to said inner surface;
   a plurality of openings in said first plate for receiving fluid, each of said openings being aligned with one of said filter openings;
   a plurality of filter baskets, each having an upper portion supported on said first plate and passing through one of said first plate openings;
   a first sealing gasket supported by said first plate and having a pluraltiy of openings aligned with said openings in said first plate and located between portions of said filter baskets and said first plate, portions of said first sealing gasket also being located between said plurality of filter baskets;
   a second plate spaced from said first plate, but located next to each of said upper portions of said plurality of filter baskets, and mounted in said vessel for relative longitudinal movement in said vessel and having a plurality of openings aligned with said openings in said first plate;
   a second sealing gasket spaced from said first sealing gasket and having a plurality of openings aligned with said openings in said first sealing gasket and located between portions of said filter baskets and said second plate, each of said openings in said second sealing gasket being less in size than said filter element openings; and
   means for applying a force tending to move said second plate toward said first plate to effect a seal between said filter baskets and said first plate and between said filter baskets and said second plate.

2. Apparatus as in claim 1 wherein:
said first and third filter vessels have a plurality of relatively coarse micron cut filter elements and said second and fourth vessels having a plurality of relatively fine micron cut filter elements.

3. Apparatus as in claim 2 wherein:
at least six filter elements are in each of said vessels.

4. Apparatus as in claim 3 wherein:
said filter elements are in the size range of between about 1 to 100 microns.

5. Apparatus as in claim 4 and further comprising:
means for mounting said first and second filter units, said discharge conduit and said means for connecting said first and second filter units to said source of contaminated fluid and said means for connecting said discharge conduit to said source of contaminated fluid on a mobile unit; and
means for connecting said discharge conduit to the suction end of a ring pump.

6. Apparatus as in claim 4 wherein:
each of said vessels is generally cylindrical in cross section; and
the longitudinal extent of each of said vessels is greater than its diameter.

7. Apparatus as in claim 6 wherein:
each of said filter elements is generally cylindrical in cross-section;
the longitudinal extent of each of said filter elements is greater than its diameter; and
said means for mounting said filter elements in each of said vessels are configured so that the longitudinal axes of said filter elements are in parallel relationship.

8. Apparatus as in claim 1 wherein said means for opening and closing each of said passageways comprises:
an on-off valve.

9. Apparatus as in claim 1 and further comprising:
a filter bag located in each of said filter baskets; and
each of said vessels and each of said filter elements comprising a material capable of withstanding pressures of at least 30 psi.

* * * * *